United States Patent
Lan et al.

(10) Patent No.: US 11,461,462 B1
(45) Date of Patent: Oct. 4, 2022

(54) SYSTEMS AND METHODS FOR PRODUCING ADJUSTMENTS TO MALWARE-DETECTING SERVICES

(71) Applicant: CA, Inc., San Jose, CA (US)

(72) Inventors: Qichao Lan, Torrance, CA (US); Junda Zhu, Culver City, CA (US); Shaolong Shu, Torrance, CA (US); Tao Cheng, Cypress, CA (US); Rudy Senstad, Culver City, CA (US)

(73) Assignee: CA, Inc., San Jose, CA (US)

( * ) Notice: Subject to any disclaimer, the term of this patent is extended or adjusted under 35 U.S.C. 154(b) by 1049 days.

(21) Appl. No.: 16/138,939

(22) Filed: Sep. 21, 2018

(51) Int. Cl.
*G06F 21/55* (2013.01)
*G06F 21/56* (2013.01)
*G06N 20/00* (2019.01)
*G06N 7/00* (2006.01)
*G06K 9/62* (2022.01)

(52) U.S. Cl.
CPC ............ *G06F 21/552* (2013.01); *G06F 21/56* (2013.01); *G06N 20/00* (2019.01); *G06K 9/6256* (2013.01); *G06N 7/00* (2013.01)

(58) Field of Classification Search
CPC ............................... G06F 21/552; G06F 21/56
USPC .......................................................... 726/22
See application file for complete search history.

(56) References Cited

U.S. PATENT DOCUMENTS

| | | | | |
|---|---|---|---|---|
| 10,063,582 B1* | 8/2018 | Feng | .................... | G06F 21/575 |
| 10,831,891 B2* | 11/2020 | Chistyakov | ........... | G06F 21/563 |
| 10,867,303 B1* | 12/2020 | Manapat | .............. | G06Q 20/405 |
| 11,170,104 B1* | 11/2021 | Stickle | .................... | G06N 20/00 |
| 11,227,047 B1* | 1/2022 | Vashisht | ............... | G06F 21/552 |
| 2013/0291111 A1* | 10/2013 | Zhou | ...................... | G06F 21/566 726/23 |
| 2018/0253661 A1* | 9/2018 | Strauss | .................. | G06Q 50/01 |
| 2019/0243972 A1* | 8/2019 | Krylov | .................. | G06F 21/561 |

(Continued)

OTHER PUBLICATIONS

Singh, Aishwarya, "A Comprehensive Guide to Ensemble Learning (with Python codes)", accessed at https://www.analyticsvidhya.com/blog/2018/06/comprehensive-guide-for-ensemble-models/, accessed on Sep. 29, 2018, 67 pages.

(Continued)

*Primary Examiner* — Badri Narayanan Champakesan
(74) *Attorney, Agent, or Firm* — Foley & Lardner LLP

(57) ABSTRACT

The disclosed computer-implemented method for producing adjustments to malware-detecting services may include (1) receiving, from a plurality of malware-detecting services executing on a plurality of client computing devices, a respective plurality of probability scores with corresponding model identifiers for an analyzed file and a plurality of respective identifiers describing the malware-detecting services, (2) building a training dataset from at least a portion of the received plurality of probability scores with corresponding model identifiers, and (3) performing a security action including (A) training, with the training dataset, a malware-detecting linear regression ensemble machine learning model that is specific to an identifier in the plurality of identifiers and (B) sending the trained linear regression ensemble machine learning model to one of the plurality of malware-detecting services executing on one of the client computing devices. Various other methods, systems, and computer-readable media are also disclosed.

19 Claims, 6 Drawing Sheets

(56) References Cited

U.S. PATENT DOCUMENTS

2020/0167471 A1* 5/2020 Rouhani ................ G06N 7/005
2020/0226503 A1* 7/2020 Subramanian ........ G06F 16/387
2021/0248515 A1* 8/2021 Ding ........................ G06N 5/04

OTHER PUBLICATIONS

Howel, Sagar, "Ensemble Learning in Machine Learning | Getting Started", accessed at https://towardsdatascience.com/ensemble-learning-in-machine-learning-getting-started-4ed85eb38e00, accessed on Sep. 29, 2018, 12 pages.

* cited by examiner

SYSTEMS AND METHODS FOR PRODUCING ADJUSTMENTS TO MALWARE-DETECTING SERVICES

BACKGROUND

Anti-malware services running on client devices may implement various types of machine learning classifier models to identify malware. Some of the services may deploy different machine learning classifier models, which may result in different conviction decisions for the same files. Further, updating the different machine learning classifier models requires analyzing at backend locations. Thus, transferring large quantities of file samples from client machines to backend locations may take a long time. Also, privacy regulations may limit transferring file samples from client machines. The instant disclosure, therefore, identifies and addresses a need for systems and methods for producing adjustments to malware-detecting services.

SUMMARY

As will be described in greater detail below, the instant disclosure describes various systems and methods for producing adjustments to malware-detecting services.

In one example, a method for producing adjustments to malware-detecting services may include (1) receiving, at a computing device and from a plurality of malware detecting services executing on a plurality of client computing devices, a respective plurality of probability scores with corresponding model identifiers for an analyzed file and a plurality of respective identifiers describing the malware-detecting services, (2) building, at the computing device, a training dataset from at least a portion of the received plurality of probability scores with corresponding model identifiers, and (3) performing a security action including (A) training, at the computing device and with the training dataset, a malware-detecting linear regression ensemble machine learning model that is specific to an identifier in the plurality of identifiers and (B) sending the trained linear regression ensemble machine learning model from the computing device to a first malware-detecting service executing on a first client computing device. The first malware-detecting service may be one of the plurality of malware-detecting services and the first client computing device may be one of the client computing devices.

In some embodiments, the security action may further include (1) incorporating, by the first client computing device, the trained linear regression ensemble machine learning model into the first malware-detecting service, (2) reanalyzing the file, by the first malware detecting service, to produce an updated probability score for the file, and (3) protecting the first client computing device against the file when the updated probability score meets a predetermined threshold.

In some examples, the plurality of probability scores with corresponding model identifiers may include at least one analyzed malware probability score. In some examples, the plurality of probability scores with corresponding model identifiers may include at least one false negative probability score. In some embodiments, the plurality of probability scores with corresponding model identifiers may include at least one false positive probability score. In some examples, the plurality of probability scores with corresponding model identifiers may include at least one true negative probability score. In some embodiments, the plurality of probability scores with corresponding model identifiers may include at least one true positive probability score. In some examples, the plurality of probability scores with corresponding model identifiers may include at least one analyzed probability score indicating the analyzed file is clean (i.e., benign).

In an example, the method may further include (1) aggregating, in a cloud-based storage device, the respective plurality of probability scores with corresponding model identifiers with corresponding model identifiers and the respective plurality of service identifiers and (2) retrieving, from the cloud-based storage device, the respective plurality of probability scores with corresponding model identifiers with corresponding model identifiers and the respective plurality of service identifiers.

In an embodiment, the method may further include (1) identifying, from an identifier in the plurality of respective identifiers, a first machine learning model configured to analyze a file attribute and (2) configuring the linear regression ensemble machine learning model to include a second machine learning model configured to analyze the file attribute.

In some examples, the trained linear regression ensemble machine learning model may include one or more conviction thresholds.

In some embodiments, the linear regression ensemble machine learning model may include at least two different constituent machine learning models.

In some examples, the method may further include (1) receiving, at a client device, the trained linear regression ensemble machine learning model and (2) analyzing, as a security action and at the client device, the file with the trained linear regression ensemble machine learning model to detect malware.

In one embodiment, a system for producing adjustments to malware-detecting services may include at least one physical processor and physical memory that includes computer-executable instructions that, when executed by the physical processor, cause the physical processor to (1) receive, at the system and from a plurality of malware-detecting services executing on a plurality of client computing devices, a respective plurality of probability scores with corresponding model identifiers for an analyzed file and a plurality of respective identifiers describing the malware-detecting services, (2) build, at the system, a training dataset from at least a portion of the received plurality of probability scores with corresponding model identifiers, and (3) perform a security action including (A) training, at the system and with the training dataset, a malware-detecting linear regression ensemble machine learning model that is specific to an identifier in the plurality of identifiers and (B) sending the trained linear regression ensemble machine learning model from the computing device to a first malware-detecting service executing on a first client computing device. The first malware-detecting service may be one of the plurality of malware-detecting services and the first client computing device may be one of the client computing devices.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, at the computing device and from a plurality of malware-detecting services executing on a plurality of client computing devices, a respective plurality of probability scores with corresponding model identifiers with corresponding model identifiers for an analyzed file and a plurality of respective identifiers describing the malware-detecting services, (2) build, at the computing device, a training dataset from at least a portion of the received plurality of probability scores with corresponding model identifiers, and (3) perform a security action including (A) training, at the computing device and with the training dataset, a malware-detecting linear regression ensemble machine learning model that is specific to an identifier in the plurality of identifiers and (B) sending the trained linear regression ensemble machine learning model from the computing device to a first malware-detecting service executing on a first client computing device. The first malware-detecting service may be one of the plurality of malware-detecting services and the first client computing device may be one of the client computing devices.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
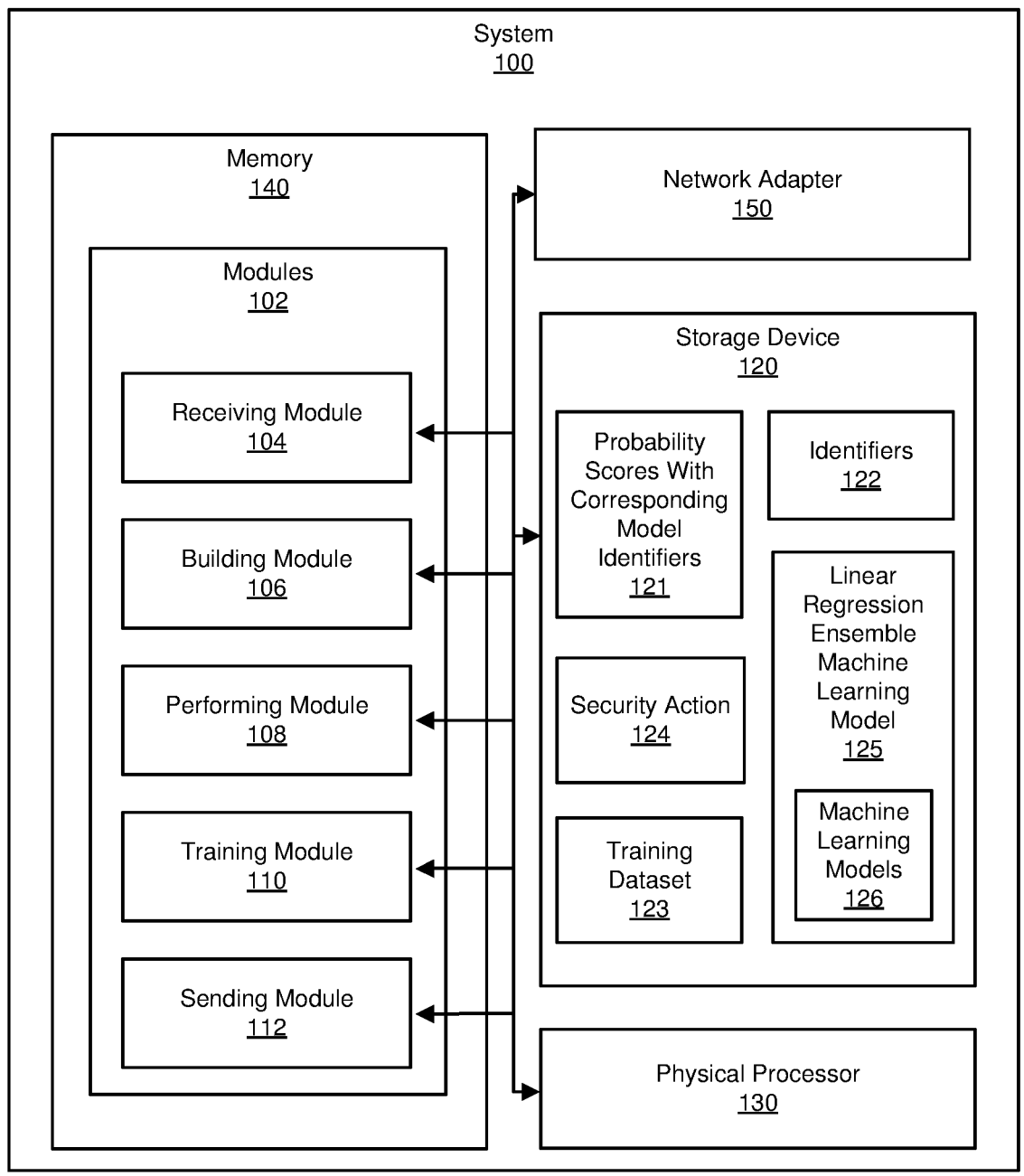
FIG. 1 is a block diagram of an example system for producing adjustments to malware-detecting services.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for producing adjustments to malware-detecting services. In some examples, as will be explained in greater detail below, techniques described herein may automatically perform techniques that producing adjustments to malware-detecting services.

In some examples, provided techniques may align different machine learning classifier models to reduce occurrences of inconsistent conviction decisions among the different machine learning classifier models, false positive conviction decisions, and false negative conviction decisions. In some embodiments, client computing devices send telemetry information from different malware-detecting services on client computing devices to servers, so the servers may use "in-field" file characteristics to enhance machine learning malware classifiers. Telemetry information may include file hashes of analyzed files, respective probability scores with corresponding model identifiers, identifiers of malware-detecting services, the like, or combinations thereof. The servers may build training datasets based at least in part of the received telemetry data. Thus, the servers may build the training datasets from telemetry information provided by large numbers of client computing devices. Therefore, the servers may analyze much more information than the individual client computing devices across different malware-detecting services. In some examples, the servers then use the training datasets to train malware-detecting linear regression ensemble machine learning models with the training datasets.

The malware-detecting linear regression ensemble machine learning models may then be sent to the individual client computing devices and implemented as adjustments to malware-detecting processes. For example, the malware-detecting linear regression ensemble machine learning models may be used in place of, or in addition to, machine-learning classifiers implemented by the malware-detecting processes. In some examples, weights and conviction thresholds for machine learning classifiers may be sent to the individual client computing devices and implemented as adjustments to machine-learning classifiers implemented by the malware-detecting processes. In some examples, individual client computing devices may incorporate the trained linear regression ensemble machine learning model into the malware-detecting services, reanalyze the files to produce an updated probability scores for the files, and protecting the client computing devices against the files when the updated probability scores meet predetermined thresholds.

In some examples, the telemetry information need not include files analyzed by the malware-detecting services and/or samples of the files analyzed by the malware-detecting services. Limiting contents of telemetry information in this manner may enhance user data privacy and/or may enable compliance with privacy regulations by keeping private customer data off of networks and preventing attackers from tracing and/or reverse-engineering probability scores back to specific user data. Limiting contents of telemetry information in this manner may also reduce a quantity of information transferred between client computing devices and severs, which may speed processing times and/or save energy.

By doing so, the systems and methods described herein may improve computing devices. Examples of computing devices in which the provided techniques may be implemented include, and are not limited to, gateway servers, server devices, networking devices, cloud security devices, laptop computers, tablet computers, desktop computers, wearable computing devices (e.g., smart watches, smart glasses), smartphone devices, identify verification devices, access control devices, and/or smart televisions. As such, the provided techniques may advantageously increase accuracy of malware-detecting services on client computing devices. Further, the provided techniques may advantageously improve accuracy of malware determinations (e.g., reduce false positive determinations and/or reduce false negative determinations). In some examples, the provided techniques may advantageously maintain privacy of users of the client computing devices. In some embodiments, the provided techniques may advantageously reduce a quantity of information transferred between client computing devices and severs. Also, the systems and methods described herein may beneficially improve anti-malware services and/or software.

Figure 2:
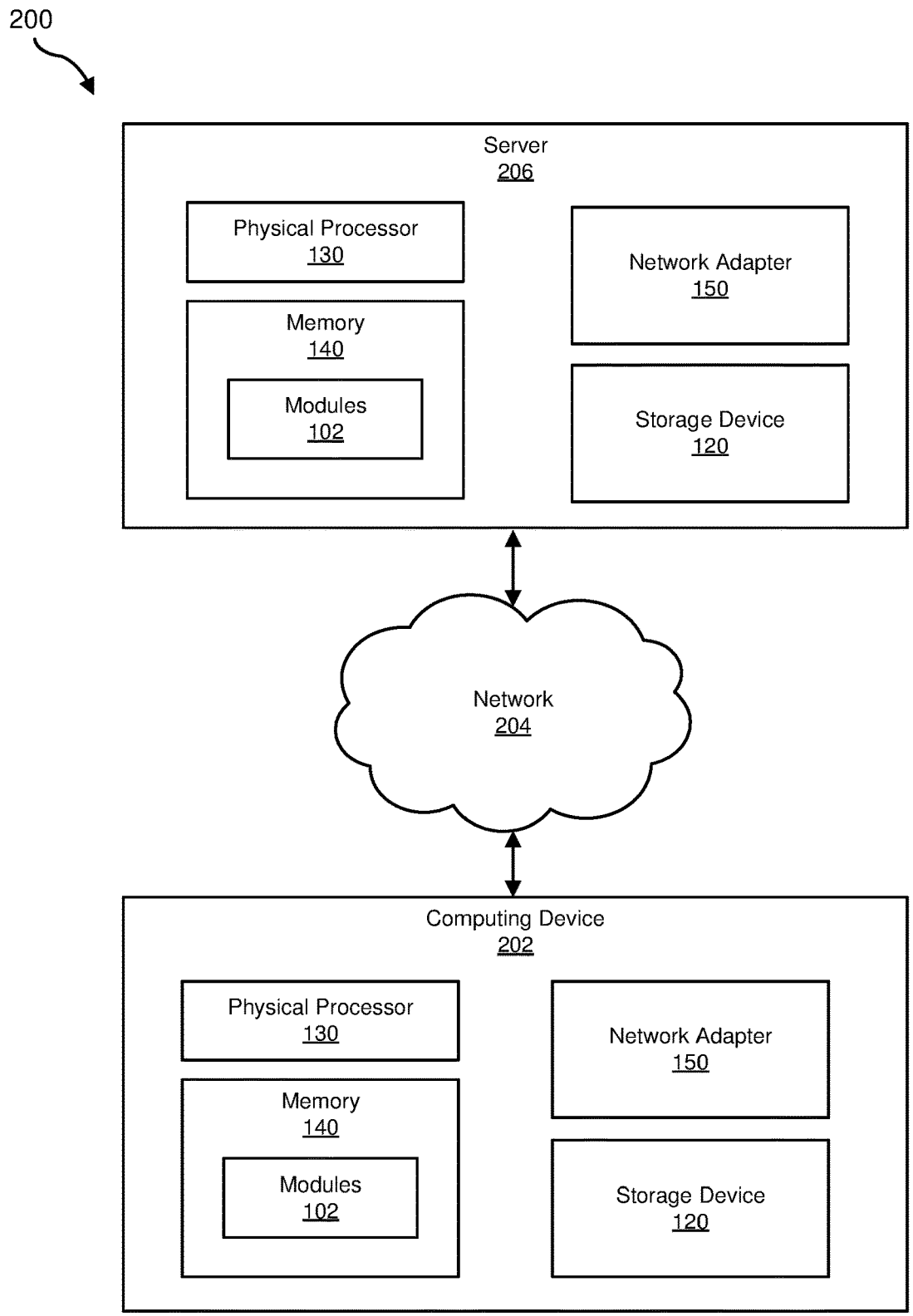
FIG. 2 is a block diagram of an additional example system for producing adjustments to malware-detecting services.
Figure 3:
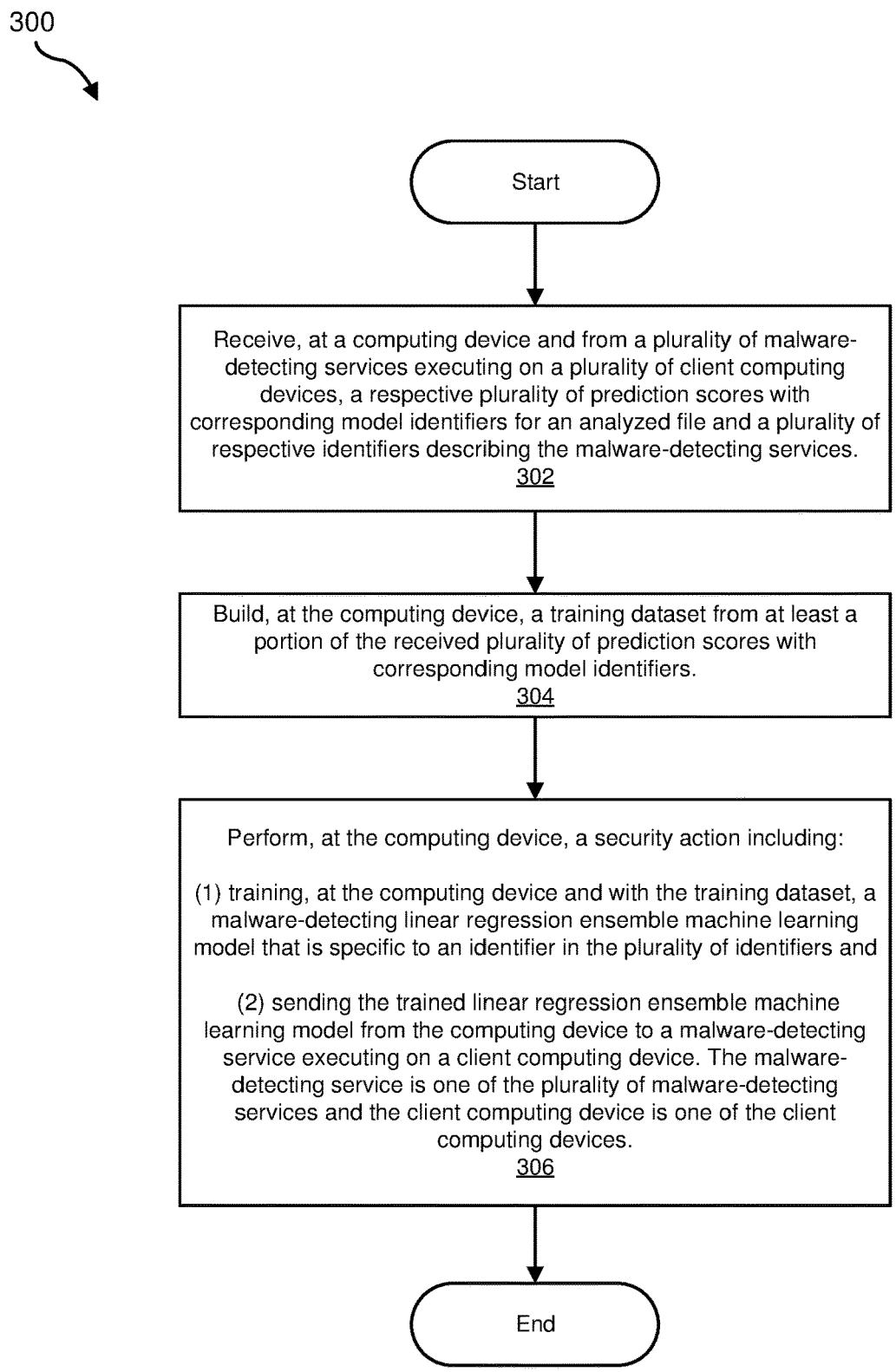
FIG. 3 is a flow diagram of an example method for producing adjustments to malware-detecting services.
Figure 4:
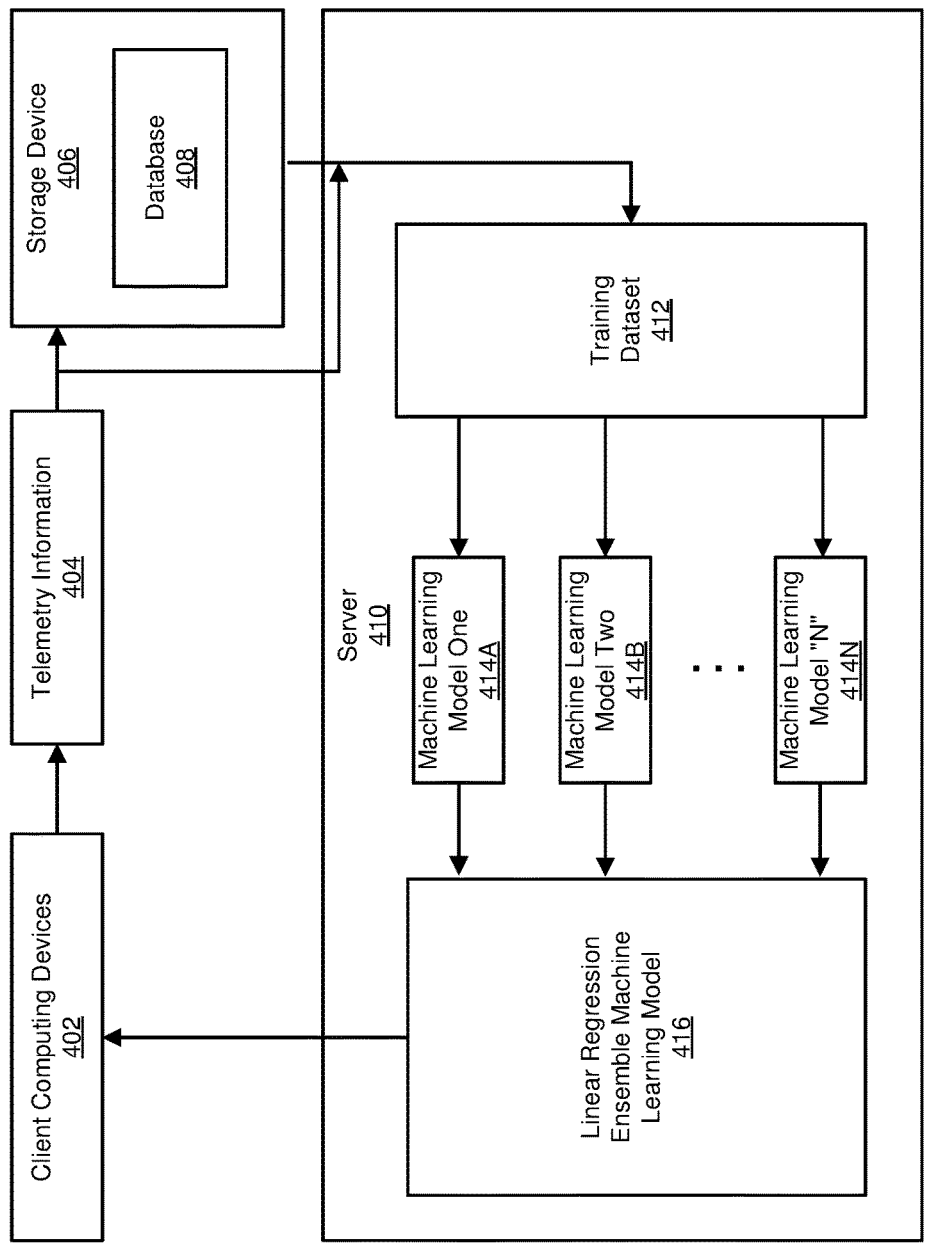
FIG. 4 is a block diagram of an additional example system for producing adjustments to malware-detecting services.

The following will provide, with reference to FIGS. 1-2 and 4, detailed descriptions of example systems for producing adjustments to malware-detecting services. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 5 and 6, respectively.

FIG. 1 is a block diagram of an example system 100 for producing adjustments to malware-detecting services. As illustrated in this figure, example system 100 may include one or more modules 102 for performing one or more tasks. As will be explained in greater detail below, modules 102 may include a receiving module 104, a building module 106, a performing module 108, a training module 110, and a sending module 112. Although illustrated as separate elements, one or more of modules 102 in FIG. 1 may represent portions of a single module or application.

In some examples, servers may perform building module 106 and training module 110. In some embodiments, only servers may perform building module 106 and training module 110. In an example, client devices may not perform building module 106 and training module 110. In an embodiment, client devices may implement two or more machine learning models (e.g., machine learning models 126), a linear regression ensemble machine learning model (e.g., linear regression ensemble machine learning model 125), and a module configured to calculate machine learning attributes (e.g., telemetry information 404).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more tangible storage devices, such as storage device 120. Storage device 120 generally represents any type or form of volatile or non-volatile storage device or medium capable of storing data and/or computer-readable instructions. In one example, storage device 120 may store, load, and/or maintain information indicating one or more of probability scores with corresponding model identifiers 121, identifiers 122, training dataset 123, security action 124, linear regression ensemble machine learning model 125, and/or machine learning models 126. In some embodiments, linear regression ensemble machine learning model 125 may include at least two different constituent machine learning models 126.

In some examples, storage device 120 may generally represent multiple storage devices. Examples of storage device 120 include, without limitation, Random Access Memory (RAM), Read Only Memory (ROM), flash memory, Hard Disk Drives (HDDs), Solid-State Drives (SSDs), optical disk drives, caches, a cloud-based storage device, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate producing adjustments to malware-detecting services. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more network devices, such as network adapter 150. Network adapter 150 broadly represents any type or form of communication device or adapter capable of facilitating communication between example system 100 and one or more additional devices. For example, in certain embodiments network adapter 150 may facilitate communication between system 100 and a private or public network including additional computing systems. Examples of network adapter 150 include, without limitation, a wired network interface (such as a network interface card), a wireless network interface (such as a wireless network interface card), a modem, and any other suitable interface. In at least one embodiment, network adapter 150 may provide a direct connection to a remote server via a direct link to a network, such as the Internet and/or network 204 in FIG. 2. Network adapter 150 may also indirectly provide such a connection through, for example, a local area network (such as an Ethernet network), a personal area network, a telephone or cable network, a cellular telephone connection, a satellite data connection, or any other suitable connection.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to produce adjustments to malware-detecting services. For example, and as will be described in greater detail below, one or more of modules 102 may cause computing device 202 and/or server 206 to (1) receive, at computing device 202 and/or server 206 and from a plurality of malware-detecting services executing on a plurality of client computing devices, respective plurality of probability scores with corresponding model identifiers 121 (e.g., on a scale of zero to one) for an analyzed file and plurality of respective identifiers 122 describing the malware-detecting services, (2) build, at computing device 202 and/or server 206, training dataset 123 from at least a portion of received plurality of probability scores with corresponding model identifiers 121, and (3) perform security action 124 including (A) training, at the computing device 202 and/or server 206 and with training dataset 123, malware-detecting linear regression ensemble machine learning model 125 that may be specific to an identifier in the plurality of identifiers 122 and (B) sending trained linear regression ensemble machine learning model 125 from computing device 202 and/or server 206 to a first malware-detecting service executing on a first client computing device. The first malware-detecting service may be one of the plurality of malware-detecting services and the first client computing device may be one of the client computing devices.

Computing device 202 generally represents any type or form of computing device capable of reading computer-executable instructions. In some examples, computing device 202 may represent a computer running anti-malware software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 206 generally represents any type or form of computing device that is capable of reading computer-executable instructions. In some examples, server 206 may represent a computer running anti-malware software. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

FIGS. 3-4 depict example aspects of computer-implemented methods and systems for producing adjustments to malware-detecting services. FIG. 3 is a flow diagram of an example computer-implemented method 300 for producing adjustments to malware-detecting services. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below. FIG. 4 is a block diagram of an additional example system 400 for producing adjustments to malware-detecting services. System 400 may include client computing devices 402, a storage device 406, and a server 410. We now turn to FIG. 3.

As illustrated in FIG. 3, at step 302 one or more of the systems described herein may receive, from a plurality of malware-detecting services executing on a plurality of client computing devices, a respective plurality of probability scores with corresponding model identifiers for analyzed files and/or a plurality of respective identifiers describing the malware-detecting services. The systems described herein may perform step 302 in a variety of ways. For example, receiving module 104 may, as part of computing device 202 and/or server 206 in FIG. 2, receive, from a plurality of malware-detecting services executing on a plurality of client computing devices, respective plurality of probability scores with corresponding model identifiers 121 for an analyzed file and plurality of respective identifiers 122 describing the malware-detecting services.

Referring to FIG. 4, client computing devices 402 may send, from a plurality of malware-detecting services executing on client computing devices 402, telemetry information 404 to storage device 406 and/or server 410. In some examples, storage device 406 may store database 408, in which telemetry information 404 may optionally be aggregated. In some embodiments, telemetry information 404 may include a respective plurality of probability scores with corresponding model identifiers for analyzed files, malware-detecting service identifiers, and/or a plurality of respective identifiers describing the malware-detecting services. In some examples, telemetry information 404 may include multiple probability scores with corresponding model identifiers for the same analyzed file. We now return to FIG. 3.

In one example of step 302, computing device 202 and/or server 206 in FIG. 2 may receive respective plurality of probability scores with corresponding model identifiers 121 and plurality of respective identifiers 122 via network adapter 150.

In some embodiments, aggregating large numbers of respective pluralities of probability scores with corresponding model identifiers for analyzed files and pluralities of respective identifiers describing malware-detecting services may be advantageous in order to increase accuracy of results of example computer-implemented method 300. Thus, in some examples, computer-implemented method 300 may include aggregating (e.g., in cloud-based storage devices) the respective pluralities of probability scores with corresponding model identifiers and the respective pluralities of service identifiers. In some examples, computer-implemented method 300 may include retrieving (e.g., from cloud-based storage devices) the respective pluralities of probability scores with corresponding model identifiers and the respective pluralities of service identifiers.

In an example, malware-detecting services implemented on client computing devices may include machine learning malware classifiers deployed by servers such as server 206 in FIG. 2 and/or server 410 in FIG. 4.

In an embodiment, identifiers describing the malware-detecting services may be used to identify machine learning malware classifiers implemented in the malware-detecting services and characteristics thereof, such as which file attributes the machine learning malware classifiers are configured to analyze. In an embodiment, identifiers describing the malware-detecting services may be used to identify operating environments of the machine learning malware classifiers.

As illustrated in FIG. 3, at step 304 one or more of the systems described herein may build training datasets from at least a portion of the received plurality of probability scores with corresponding model identifiers 121. The systems described herein may perform step 304 in a variety of ways. For example, building module 106 may, as part of computing device 202 and/or server 206 in FIG. 2, build training dataset 123 from at least a portion of the received plurality of probability scores with corresponding model identifiers 121.

Referring to FIG. 4, server 410 may build, from telemetry information 404, training dataset 412. In some examples, telemetry information 404 may optionally be retrieved from storage in database 408 prior to building training datasets. In some examples, training dataset 412 may include plurality of probability scores with corresponding model identifiers 121, plurality of respective identifiers 122 describing the respective malware-detecting services, and respective classification labels (e.g., malware, benign) associated with the plurality of probability scores with corresponding model identifiers 121. We now return to FIG. 3.

In some examples, training datasets may be used to adjust weights and/or conviction thresholds of machine learning classifiers in at least one of the malware-detecting services implemented by client computing devices.

As illustrated in FIG. 3, at step 306 one or more of the systems described herein may performing security actions including (1) training, with the training datasets, malware-detecting linear regression ensemble machine learning models that may be specific to identifiers in the plurality of identifiers and (2) sending the trained linear regression ensemble machine learning model from the computing device to a first malware-detecting service executing on a first client computing device. The first malware-detecting service may be one of the plurality of malware-detecting services and the first client computing device may be one of the client computing devices. The systems described herein may perform step 306 in a variety of ways. For example, performing module 108 may, as part of computing device 202 and/or server 206 in FIG. 2, perform security action 124. Security action 124 may include training, with training dataset 123, machine learning models 126 in malware-detecting linear regression ensemble machine learning model 125. In some examples, malware-detecting linear regression ensemble machine learning model 125 may be specific to an identifier in the plurality of identifiers 122. Security action 124 may include sending trained linear regression ensemble machine learning model 125 from computing device 202 and/or server 206 to a first malware-detecting service executing on a first client computing device (e.g., via network adapter 150). The first malware-detecting service may be one of the plurality of malware-detecting services and the first client computing device may be one of the client computing devices.

In some embodiments, the security action may further include (1) incorporating, by the first client computing device, the trained linear regression ensemble machine learning model into the first malware-detecting service, (2) reanalyzing the file, by the first malware detecting service, to produce an updated probability score for the file, and (3) protecting the first client computing device against the file when the updated probability score meets a predetermined threshold.

Referring to FIG. 4, server 410 may train, with training dataset 412, respective machine learning models such as machine learning model one 414A, machine learning model two 414B, machine learning model "N" 414N, and/or the like. In some examples, machine learning model one 414A, machine learning model two 414B, machine learning model "N" 414N, and/or the like may be selected for use based on telemetry information. For example, machine learning models in server 410 may be selected for use based on received identifiers describing malware-detecting services that are at least a part of client computing devices 402 that have similar machine-learning malware classifiers.

In some examples, server 410 may aggregate at least two of the respective machine learning models into a malware-detecting linear regression ensemble machine learning model 416. In some embodiments, linear regression ensemble machine learning model 416 may be specific to identifiers in the plurality of identifiers. In some examples, server 410 may send trained linear regression ensemble machine learning model 416 to at least one of the malware-detecting services implemented by client computing devices 402 as an adjustment to at least one of the malware-detecting services. In some examples, server 410 may send weights and conviction thresholds to client computing devices 402 as adjustments to machine learning classifiers in at least one of the malware-detecting services implemented by client computing devices 402.

In some examples, client computing devices 402 may analyze, as security actions and at client computing devices 402, files with the trained linear regression ensemble machine learning model 416 to detect malware. We now return to FIG. 3.

In some examples, the plurality of probability scores with corresponding model identifiers may include at least one analyzed malware probability score. In one example, the plurality of probability scores with corresponding model identifiers may include at least one false negative probability score. In some examples, the plurality of probability scores with corresponding model identifiers may include at least one false positive probability score. In some examples, the plurality of probability scores with corresponding model identifiers may include at least one true negative probability score. In some embodiments, the plurality of probability scores with corresponding model identifiers may include at least one true positive probability score. In some examples, the plurality of probability scores with corresponding model identifiers may include at least one analyzed probability score indicating the analyzed file is clean.

In some examples, it may be advantageous to equip linear regression ensemble machine learning models with machine learning models configured to analyze specific file attributes of analyzed files on pluralities of client computing devices in order to increase accuracy of results of example computer-implemented method 300. Thus, in some embodiments, method 300 may include (1) identifying, from identifiers in the pluralities of respective identifiers, first machine learning models configured to analyze file attributes and the specific file attributes analyzed thereby and (2) configuring the linear regression ensemble machine learning models to include second machine learning models configured to analyze the file attributes.

In an example, the trained linear regression ensemble machine learning models may include conviction thresholds.

In an embodiment, the linear regression ensemble machine learning model may include at least two different constituent machine learning models.

In some examples, client computing devices implement the adjustments. Thus, in some examples, method 300 may include receiving, at client computing devices, the trained linear regression ensemble machine learning models. In some embodiments, method 300 may include analyzing, as security actions and at the client devices, files with the trained linear regression ensemble machine learning models to detect malware. In some embodiments, the trained linear regression ensemble machine learning models provide final decisions to identify files as malware based on respective probability scores exceeding conviction thresholds (i.e., to convict malware). In some examples, conviction thresholds may be user-adjustable between different levels, such as low confidence, medium confidence, medium-high confidence, and high confidence.

As detailed above, the steps outlined in method 300 in FIG. 3 may produce adjustments to malware-detecting services. By doing so, in some examples, the systems and methods described herein may improve accuracy of malware-detecting services on client computing devices. Further, the provided techniques may improve accuracy of malware determinations, maintain user privacy and/or reduce a quantity of information transferred between client computing devices and severs.

Figure 5:
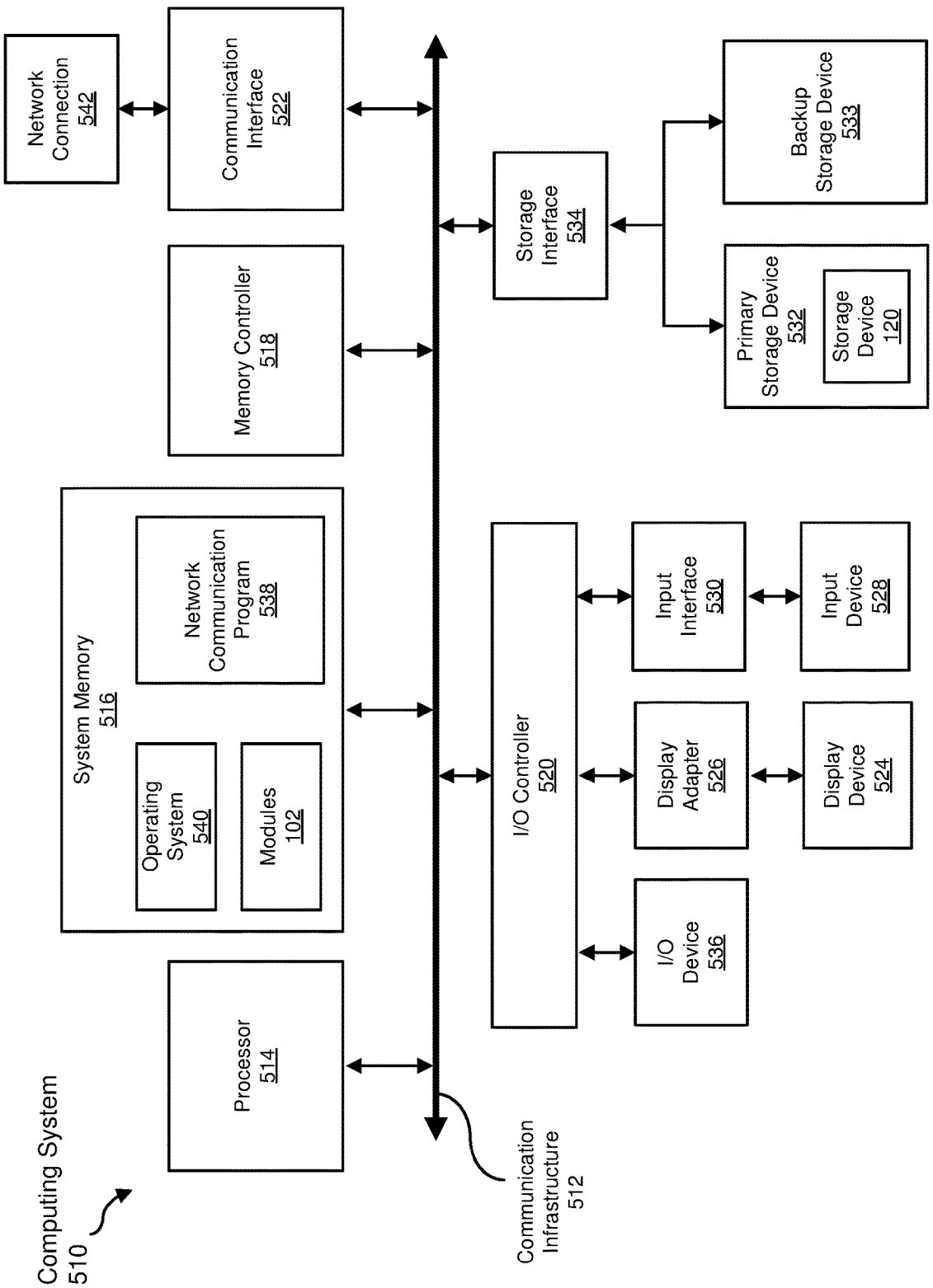
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536.

In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, storage device 120 from FIG. 1 may be at least a part of primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
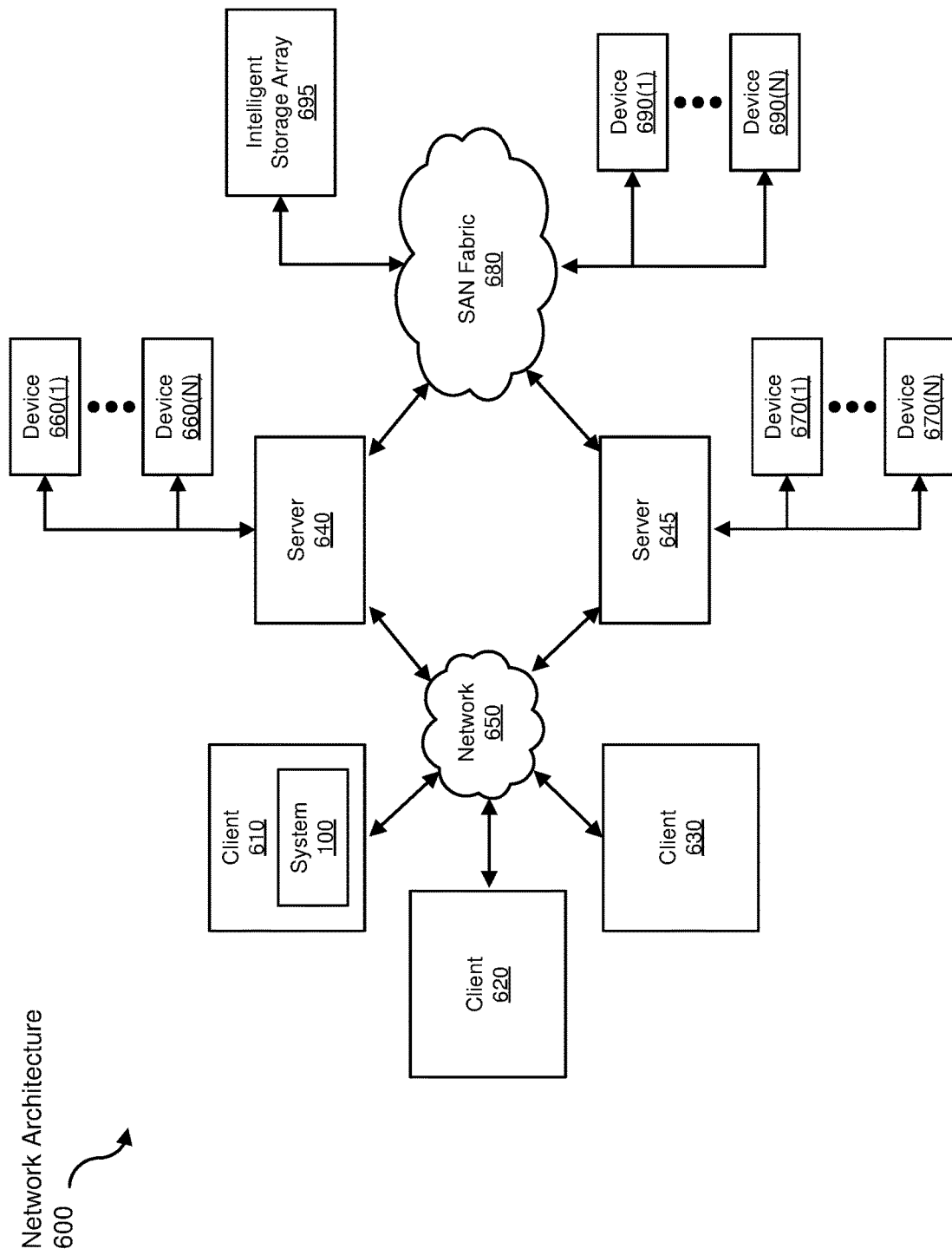
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for producing adjustments to malware-detecting services.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive telemetry data to be transformed, transform the telemetry data, output a result of the transformation to client computing devices, use the result of the transformation to adjust malware detecting systems, and store the result of the transformation to servers. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for producing adjustments to malware-detecting services, at least a portion of the method being performed by a computing device comprising at least one processor, the method comprising:

receiving, at the computing device and from a plurality of
        malware-detecting services executing on a plurality of client computing devices, a respective plurality of probability scores with corresponding model identifiers for an analyzed file and a plurality of respective identifiers describing the malware-detecting services;

building, at the computing device, a training dataset from at least a portion of the received plurality of probability scores with corresponding model identifiers; and performing a security action comprising: training, at the computing device and with the training dataset, a malware-detecting linear regression ensemble machine learning model that is specific to an identifier in the plurality of identifiers; and sending the trained linear regression ensemble machine learning model from the computing device to a first malware-detecting service executing on a first client computing device, the first malware-detecting service being one of the plurality of malware-detecting services and the first client computing device being one of the client computing devices; and incorporating, by the first client computing device, the trained linear regression ensemble machine learning model into the first malware-detecting service;

reanalyzing the file, by the first malware detecting service, to produce an updated probability score for the file; and protecting the first client computing device against the file when in response to determining that the updated probability score meets a predetermined threshold.

2. The computer-implemented method of claim 1, wherein the plurality of probability scores with corresponding model identifiers comprises at least one analyzed malware probability score.

3. The computer-implemented method of claim 1, wherein the plurality of probability scores with corresponding model identifiers comprises at least one analyzed probability score indicating the analyzed file is clean.

4. The computer-implemented method of claim 1, further comprising:

aggregating, in a cloud-based storage device, the respective plurality of probability scores with corresponding model identifiers and the respective plurality of service identifiers; and retrieving, from the cloud-based storage device, the respective plurality of probability scores with corresponding model identifiers and the respective plurality of service identifiers.

5. The computer-implemented method of claim 1, further comprising:

identifying, from an identifier in the plurality of respective identifiers, a first machine learning model configured to analyze a file attribute; and configuring the linear regression ensemble machine learning model to comprise a second machine learning model configured to analyze the file attribute.

6. The computer-implemented method of claim 1, wherein the trained linear regression ensemble machine learning model comprises one or more conviction thresholds.

7. The computer-implemented method of claim 1, wherein the linear regression ensemble machine learning model comprises at least two different constituent machine learning models.

8. The computer-implemented method of claim 1, further comprising:

receiving, at a client device, the trained linear regression ensemble machine learning model; and analyzing, as a security action and at the client device, the file with the trained linear regression ensemble machine learning model to detect malware.

9. A system for producing adjustments to malware-detecting services, the system comprising: at least one physical processor; physical memory comprising computer-executable instructions that, when executed by the physical processor, cause the physical processor to:

receive, at the system and from a plurality of malware-detecting services executing on a plurality of client computing devices, a respective plurality of probability scores with corresponding model identifiers for an analyzed file and a plurality of respective identifiers describing the malware-detecting services;

build, at the system, a training dataset from at least a portion of the received plurality of probability scores with corresponding model identifiers; and perform a security action comprising: training, at the system and with the training dataset, a malware-detecting linear regression ensemble machine learning model that is specific to an identifier in the plurality of identifiers; and sending the trained linear regression ensemble machine learning model from the computing device to a first malware-detecting service executing on a first client computing device, the first malware-detecting service being one of the plurality of malware-detecting services and the first client computing device being one of the client computing devices; and incorporating, by the first client computing device, the trained linear regression ensemble machine learning model into the first malware-detecting service;

reanalyzing the file, by the first malware detecting service, to produce an updated probability score for the file; and protecting the first client computing device against the file when in response to determining that the updated probability score meets a predetermined threshold.

10. The system of claim 9, wherein the plurality of probability scores with corresponding model identifiers comprises at least one analyzed malware probability score.

11. The system of claim 9, wherein the plurality of probability scores with corresponding model identifiers comprises at least one analyzed probability score indicating the analyzed file is clean.

12. The system of claim 9, wherein the security action further comprises:

identifying, from an identifier in the plurality of respective identifiers, a first machine learning model configured to analyze a file attribute; and configuring the linear regression ensemble machine learning model to comprise a second machine learning model configured to analyze the file attribute.

13. The system of claim 9, wherein the linear regression ensemble machine learning model comprises at least two different constituent machine learning models.

14. The system of claim 9, wherein the trained linear regression ensemble machine learning model comprises one or more conviction thresholds.

15. A non-transitory computer-readable medium comprising one or more computer-executable instructions that, when executed by at least one processor of a computing device, cause the computing device to:

receive, at the computing device and from a plurality of malware-detecting services executing on a plurality of client computing devices, a respective plurality of probability scores with corresponding model identifiers for an analyzed file and a plurality of respective identifiers describing the malware-detecting services;

build, at the computing device, a training dataset from at least a portion of the received plurality of probability scores with corresponding model identifiers; and perform a security action comprising: training, at the system and with the training dataset, a malware-detecting linear regression ensemble machine learning model that is specific to an identifier in the plurality of identifiers; and sending the trained linear regression ensemble machine learning model from the computing device to a first malware-detecting service executing on a first client computing device, the first malware-detecting service being one of the plurality of malware-detecting services and the first client computing device being one of the client computing devices; and incorporating, by the first client computing device, the trained linear regression ensemble machine learning model into the first malware-detecting service;

reanalyzing the file, by the first malware detecting service, to produce an updated probability score for the file; and protecting the first client computing device against the file when in response to determining that the updated probability score meets a predetermined threshold.

16. The non-transitory computer-readable medium of claim 15, wherein the plurality of probability scores with corresponding model identifiers comprises at least one analyzed malware probability score.

17. The non-transitory computer-readable medium of claim 15, wherein the plurality of probability scores with corresponding model identifiers comprises at least one analyzed probability score indicating the analyzed file is clean.

18. The non-transitory computer-readable medium of claim 15, wherein the one or more computer-executable instructions further comprise one or more computer-executable instructions that, when executed by at least one processor of a computing device, cause the computing device to:

identify, from an identifier in the plurality of respective identifiers, a first machine learning model configured to analyze a file attribute; and configure the linear regression ensemble machine learning model to comprise a second machine learning model configured to analyze the file attribute.

19. The non-transitory computer-readable medium of claim 15, wherein the linear regression ensemble machine learning model comprises at least two different constituent machine learning models.

* * * * *